United States Patent
Lim et al.

(10) Patent No.: US 12,432,492 B2
(45) Date of Patent: Sep. 30, 2025

(54) DEVICE, METHOD AND SYSTEM FOR DETECTING OBJECTS OF INTEREST USING SOUNDSCAPED SIGNATURES

(71) Applicant: MOTOROLA SOLUTIONS, INC., Chicago, IL (US)

(72) Inventors: Chew How Lim, Sungai Petani (MY); Chun Seng Song, Georgetown (MY); Mohd Hizami Abdul Hamid, Seberang Jaya (MY); Cheah Min Wong, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 172 days.

(21) Appl. No.: 18/513,796

(22) Filed: Nov. 20, 2023

(65) Prior Publication Data

US 2025/0168561 A1    May 22, 2025

(51) Int. Cl.
*H04R 3/00* (2006.01)
*H04R 1/40* (2006.01)
(Continued)

(52) U.S. Cl.
CPC ............. *H04R 3/005* (2013.01); *H04R 1/406* (2013.01); *H04R 3/04* (2013.01); *G06V 20/41* (2022.01)

(58) Field of Classification Search
CPC .......... H04R 3/005; H04R 3/04; H04R 1/406; G06V 20/41
(Continued)

(56) References Cited

U.S. PATENT DOCUMENTS 9,197,976 B2   11/2015   Park
10,685,075 B2   6/2020   Blanco et al.
(Continued)

FOREIGN PATENT DOCUMENTS

KR         101794733 B1    11/2017
WO    WO-2020089917 A1 *    5/2020    ........... G11B 27/036

OTHER PUBLICATIONS

Yue, Ran, et al.. "A visualized soundscape prediction model for design processes in urban parks", Building Simulation, vol. 16, No. 3, pp. 337-356, published Nov. 17, 2022—https://link.springer.com/article/10.1007/s12273-022-0955-3.
(Continued)

*Primary Examiner* — David L Ton
(74) *Attorney, Agent, or Firm* — PERRY + CURRIER INC. (FOR MSI)

(57) ABSTRACT

A device, method and system for detecting objects of interest using soundscaped signatures is provided. A device identifies, using first video or first audio from a first camera, an object of interest (OOI) and a sound type of a sound made by the OOI, and extracts a sound signature of the OOI from the first audio, using the sound type and a first soundscaping prediction model for a first environment of the first camera; generating a soundscaped signature of the OOI which predicts a modification of the sound signature in a second environment of a second camera, the soundscaped signature generated by inputting the sound signature and the sound type into a second soundscaping prediction model for the second environment. The device detects the soundscaped signature of the OOI in second audio from the second camera, and generates a notification that the OOI was detected at the second camera location.

20 Claims, 8 Drawing Sheets

(51) Int. Cl.
*H04R 3/04* (2006.01)
*G06V 20/40* (2022.01)

(58) Field of Classification Search
USPC .......................................................... 381/56
See application file for complete search history.

(56) References Cited

U.S. PATENT DOCUMENTS

| | | |
|---|---|---|
| 10,866,950 B2 | 12/2020 | Sabripour et al. |
| 11,722,763 B2 | 8/2023 | Kee et al. |
| 2023/0089648 A1* | 3/2023 | Peleg .................. H04N 5/77 386/285 |

OTHER PUBLICATIONS

Wirecutter—https://www.nytimes.com/wirecutter/blog/automatic-room-correction/.
https://developer.nvidia.com/vrworks/vrworks-audio—VRWorks—Audio.
Savioja, Lauri, "Overview of Geometrical Room Acoustic Modeling Techniques", The Journal of the Acoustical Society of America/AIP Publishing, Aug. 10, 2015.
Mehra, Ravish, et al. "Wave: Interactive Wave-based Sound Propagation for Virtual Environments", IEEE Transactions on Visualization and Computer Graphics, vol. 21, No. 4, pp. 434-442, Apr. 2015.
Luo, Andrew, et al., "Learning Neural Acoustic Fields"—https://www.andrew.cmu.edu/user/afluo/Neural_Acoustic_Fields/—downloaded Sep. 27, 2023.

\* cited by examiner

DEVICE, METHOD AND SYSTEM FOR DETECTING OBJECTS OF INTEREST USING SOUNDSCAPED SIGNATURES

BACKGROUND OF THE INVENTION

Cameras, such as video cameras, are generally enabled to capture sound signatures generated by objects of interest (OOIs), either within a field-of-view of or out of a field-of-view of such cameras, for example using microphones of the cameras. However, sound signature matching, for sounds sourced from various locations at which cameras are installed, may have high false negatives. For example, as while a sound signature may be captured in one environment, an OOI may sound different in another environment.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
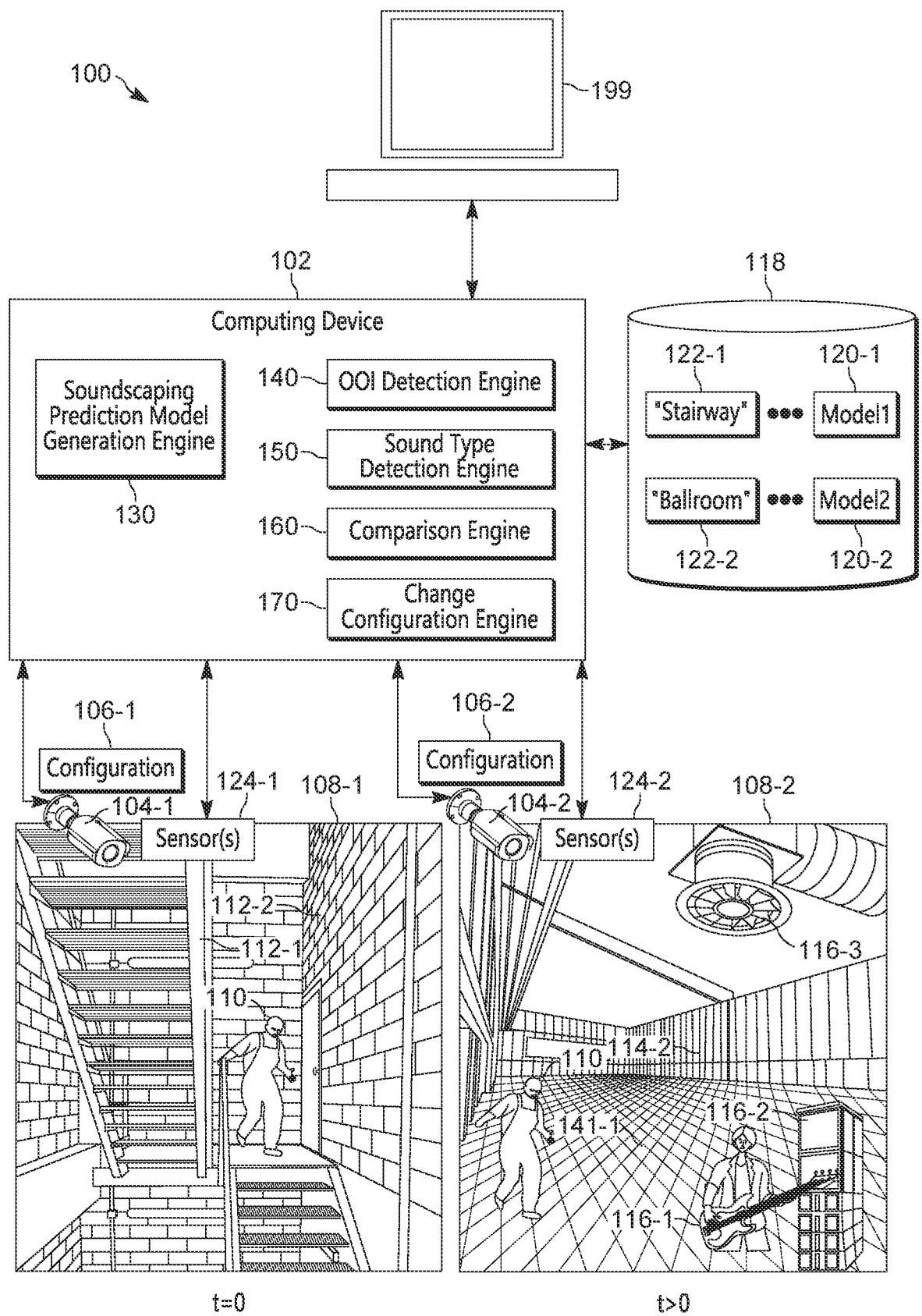
FIG. 1 is a system for detecting objects of interest using soundscaped signatures, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Tracking an object of interest (OOI) through a building, and the like, may be challenging. Cameras installed at the building, such as video cameras, may capture images of the OOI and the OOI may be tracked using such images. However, when the OOI is off-camera, the OOI may be tracked using sounds captured by microphones of cameras. Such tracking via sounds may be challenging. While a first camera may capture a sound signature made by the OOI (e.g., a sound of their footsteps) in a room where the first camera is installed, due to environmental factors, such a sound signature may change in a second room where a second camera is installed. For example, when the OOI is in a stairwell having a metal staircase, a sound signature of their footsteps may include frequencies corresponding to crisp, loud, metallic clomping, whereas when the OOI is in a carpeted ballroom, a sound signature of their footsteps may include frequencies corresponding to soft muted cushioned, distinct, tapping footsteps. While the cameras, or a central computing device connected to the cameras, may be configured to extract an audio signature of the footsteps, that attempts to isolate a sound of the footsteps from an environment of the footsteps (e.g., to match isolated footstep sounds to track the OOI), such extraction, on an environment by environment basis, occurring as respective sound signatures of the footsteps are acquired, is processing heavy, and/or time consuming.

Thus, there exists a need for an improved technical method, device, and system for detecting objects of interest using soundscaped signatures.

Hence, provided herein is a computing device in communication with a plurality of cameras, including at least a first camera and a second camera, deployed, for example in a building, through the cameras may be deployed in any suitable locations inside or outside a building and/or premises. While examples herein are described with respect to two cameras, it is understood that such examples may be extended to three or more cameras. Furthermore, while aspects of the present specification are described with respect to the computing device detecting objects of interest using soundscaped signatures, the cameras described herein may include respective processing resources and/or respective computing devices and/or analytics engines, and the like), and processes described herein may be distributed between the computing device and processing resources of the cameras.

The computing device (e.g., and/or at least one computing device, which may include the computing device and one or more respective computing devices of the cameras), is generally configured to identify, using first video and/or first audio from a first camera, an object of interest (OOI) and a sound type of a sound made by the OOI. Identification of the OOI using video or audio of the first camera may specifically identify a type of the OOI, such as a person and/or intruder moving through a building where the cameras are deployed, though, in other examples, identification of the OOI may be generic, such as assigning an identifier to the OOI, regardless of a type of the OOI (which may not be determined in some examples). Video or audio of the first camera may be used to determine that a type of sound made by the OOI are footsteps, though such a sound may be any suitable sound type, such as a jangling keychain, or necklace sound, or the OOI singing, etc., amongst other possibilities. For example, video from the first camera may be analyzed with the audio from the first camera to determine that the audio corresponds to footsteps, and the like, and/or audio from the first camera may be analyzed by the computing device to determine that the audio corresponds to footsteps, and the like.

The computing device extracts a sound signature from the first audio, using the sound type and a first soundscaping prediction model for a first environment of the first camera. For example, the computing device may have access to a memory storing soundscaping prediction models for different environments, such as soundscaping prediction models for metal stairwells, wooden stairways, ballrooms, hallways with carpets, hallways without carpets, amongst other possibilities. Such soundscaping prediction models may be generated via the computing device, and/or predetermined and provisioned at the memory. In general, such soundscaping prediction models may comprise one or more machine learning models and/or acoustic artificial intelligence (AI) algorithms. Such soundscaping prediction models may comprise different layers for different sound types, as described herein.

For example, the first audio and the sound type may be used as input to a first soundscaping prediction model for a first environment of the first camera, which may output a sound signature of the OOI. Continuing with the example of footsteps, the first audio may be input with an indication of a sound type of "footsteps" into the first soundscaping prediction model (e.g., as implemented by the soundscape extraction engine) and the first soundscaping prediction model may output a sound signature of footsteps the OOI, for example, as isolated from sounds in the first audio that correspond to, or are influenced by, environmental acoustic modifier features of the first environment. Put another way, a sound signature of the footsteps of the OOI may be determined by the computing device, the sound signature being independent of the first environment and/or environmental acoustic modifier features thereof.

The computing device may generate, for the OOI, a soundscaped signature of the OO,I which predicts a modification of the sound signature in a second environment of a second camera, the soundscaped signature generated by inputting the sound signature and the sound type into a second soundscaping prediction model for the second environment.

For example, the sound signature and the sound type may be used as input to the second soundscaping prediction model (e.g., as implemented by the sound signature prediction engine) for a second environment of the second camera, which may output a soundscaped signature of the OOI representing a prediction of the sound signature modified according to the second environment. Put another way, and continuing with the footsteps example, the footsteps of the sound signature may be modified such that soundscaped signature of the footsteps represents how the footsteps would sound in the second environment.

Using a more specific example, the first environment may comprise a staircase with metal stairs, and the second environment may comprise a ballroom with carpets. The computing device generates a sound signature of the footsteps by extracting and/or isolating a sound of the footsteps from other sounds made by the OOI on the metal stairs and/or by extracting and/or isolating a sound of the footsteps from influences of the metal stairs on the footsteps. Hence, the sound signature of the in footsteps represents, for example, a tempo of the footsteps, frequencies made by the footsteps isolated from the metal stairs, an amplitude of such frequencies, and the like. The sound signature is used to generate a soundscaped signature representing a predicted sound of the footsteps in the ballroom, for example on carpets of the ballroom.

Once the soundscaped signature is generated, the computing device may detect the soundscaped signature of the OOI in second audio from the second camera, and generate a notification that the OOI was detected at a location of the second camera. In this manner, the computing device extracts the sound signature once, and uses the sound signature to generate a soundscaped version of the sound signature for the second environment of the second camera, which may be used to detect the OOI in the second environment. Such an approach obviates processing audio captured by the second camera to again extract the sound signature.

Indeed, different soundscaped versions of the sound signature may be generated for different cameras, so that the OOI may be tracked through the building, and the like, where the cameras are deployed. In particular, the computing device may generate a respective soundscaped signature for each environment of each camera in the building, and the like, and audio from each camera may be compared to a respective soundscaped signature to search for the OOI. Hence, when the OOI does not appear in video from the cameras, the OOI may be tracked in a processing resource effective manner, as compared to extracting a sound signature of the OOI from audio from all the cameras.

An aspect of the present specification provides a method comprising: identifying, via at least one computing device, using first video or first audio from a first camera, an object of interest (OOI) and a sound type of a sound made by the OOI; extracting, via the at least one computing device, a sound signature of the OOI from the first audio, using the sound type and a first soundscaping prediction model for a first environment of the first camera; generating, via the at least one computing device, a soundscaped signature of the OOI, which predicts a modification of the sound signature in a second environment of a second camera, the soundscaped signature generated by inputting the sound signature and the sound type into a second soundscaping prediction model for the second environment; detecting, via the at least one computing device, the soundscaped signature of the OOI in second audio from the second camera; and generating, via the at least one computing device, a notification that the OOI was detected at a location of the second camera.

Another aspect of the present specification provides a device comprising: a communication interface; and a controller in communication with a first camera and second camera, the controller configured to: identify, using first video or first audio from the first camera, an object of interest (OOI) and a sound type of a sound made by the OOI; extract a sound signature of the OOI from the first audio, using the sound type and a first soundscaping prediction model for a first environment of the first camera; generating a soundscaped signature of the OOI, which predicts a modification of the sound signature in a second environment of the second camera, the soundscaped signature generated by inputting the sound signature and the sound type into a second soundscaping prediction model for the second environment; detect the soundscaped signature of the OOI in second audio from the second camera; and generate a notification that the OOI was detected at a location of the second camera.

Each of the above-mentioned embodiments will be discussed in more detail below, starting with example system and device architectures of the system in which the embodiments may be practiced, followed by an illustration of processing blocks for achieving an improved technical method, device, and system for microphonic noise compensation.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for detecting objects of interest using soundscaped signatures. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a computing device 102, which is in communication with at least a first camera 104-1 and a second camera 104-2, interchangeably referred to hereafter, collectively, as the cameras 104 and, generically, as a camera 104. This convention will be used elsewhere in the present specification. For example, as depicted, the first camera 104-1 may operate according to a first configuration 106-1, and the second camera 104-2 may operate according to a second configuration 106-2 (e.g., the configurations 106 and/or a configuration 106). While only two cameras 104 are depicted, it is understood that the system 100 may comprise any suitable number of two or more cameras 104, operating according to respective configurations, the two or more cameras 104 being interconnected, for example via the computing device 102 and/or in any other suitable manner.

It is understood that the cameras 104 are generally configured to acquire a combination of video and audio, and hence comprise respective image sensors (e.g., such as respective charge-coupled devices (CCDs), and the like), respective lenses, respective apertures, and respective microphones, and the configurations 106 may represent operating parameters of the respective image sensors and/or respective lenses and/or respective apertures and/or respective microphones. In particular, The configurations 106 may define operating parameters of the cameras, including, but not limited to, operating parameters related to sensitivity of respective microphones of the cameras 104, such as frequency sensitivity, and the like. Furthermore, it is understood that, in some examples, the configurations 106 may be changed, for example to increase or decrease sensitivity of microphones to given frequencies, and/or to filter sounds received at a camera 104 accordingly. For example, a camera 104 may comprise an equalizer, and a configuration 106 may define settings of the equalizer. In yet further examples, the configurations 106 may define operating parameters related to beamforming of microphones, such that sensitivity of a microphone of a camera 104 may be controlled in a particular direction. In yet further examples, the configurations 106 may define operating parameters related to movement and/or PTZ (pan, track, zoom) of the cameras 104, such that PTZ of a camera 104 may be controlled to point the camera 104, and/or a microphone thereof, in a particular direction.

As depicted, the first camera 104-1 is deployed to capture video and audio in a first environment 108-1, and the second camera 104-1 is deployed to capture video and audio in a second environment 108-2 (e.g., the environments 108 and/or an environment 108). For example, the cameras 104 may be in respective fixed locations in their respective environments 108, for example mounted to a wall and/or pole, and the like, and may have respective fixed fields-of-view, or may be configured to pan, track, zoom (e.g., PTZ functionality) and the like at the respective fixed locations.

As depicted, the first environment 108-1 comprises a staircase (e.g., a metal staircase), and an OOI 110 is moving down the staircase, for example, as depicted, at a time of t=0. As depicted, the second environment 108-2 comprises a ballroom (e.g., a carpeted ballroom), and the OOI 110 is also depicted in the second environment 108-2, for example at a later time, t>0. As such, it is understood that in the depicted example, the OOI 110 being in the second environment 108-2 occurs at a later time than the OOI 110 being in the first environment 108-1. Put another way, the OOI 110 is understood to be moving through a building or premises that include the environments 108 and the cameras 104.

As depicted, the first environment 108-1 includes various first environmental acoustic modifier features 112, such as a metal staircase (e.g., environmental acoustic modifier feature 112-1), brick walls (e.g., environmental acoustic modifier feature 112-2), and the like. The metal staircase and/or the brick walls are understood to modify sound made by the OOI 110, and may lead to echo, reverberation, and the like, of various specific frequencies. Similarly, the second environment 108-2 includes various second environmental acoustic modifier features 114, such as a carpet (e.g., environmental acoustic modifier feature 114-1), and wood walls (e.g., environmental acoustic modifier feature 114-2) and wood walls (e.g., environmental acoustic modifier feature 114-3), which are fixed. The carpet and/or the wood walls are understood to modify sound made by the OOI 110, in a different manner than the metal staircase and brick walls, and may lead to echo, reverberation, and the like, of various specific frequencies that are different from those generated in the first environment 108-1. The second environment 108-2 further includes other environmental acoustic modifier features 116, which may be temporary, such as a bass guitar (e.g., environmental acoustic modifier feature 116-1), a woofer speaker (e.g., environmental acoustic modifier feature 116-2), and a heating, ventilation, and air conditioning (HVAC) outlet (e.g., environmental acoustic modifier feature 116-3), all of which may be present, or not, and/or on, or off, at different times. For example, the bass guitar may, or may not, be played, or present, at any given time, the woofer speaker may, or may not, be emitting noise, or present, at any given time, and the HVAC outlet may, or may not, be "on" and/or emitting noise at any given time. The other environmental acoustic modifier features 116 may hence interfere with, or not interfere with, detection of the OOI 110 via sound, as described herein.

Indeed, any suitable acoustic modifier features (e.g. in any of the environments 108), and/or combination thereof, are within the scope of the present specification including, but not limited to, one or more of: obstacles to sound, sound absorbers, surfaces that reflect sound that may be of different surface textures, a layout of an environment (e.g. locations of walls, furniture, barriers, heights of ceilings, and the like), flooring material, ambient noise, room temperature, humidity, amongst other possibilities.

As depicted, the system 100 further comprises a memory 118 (e.g., which, as depicted, may be provided in the form of a database) to which the computing device 102 has access. The memory 118 may be external (as depicted) or internal to the computing device 102. The memory 118 stores at least a first soundscaping prediction model 120-1 (e.g., labelled "Model1 in FIG. 1, for simplicity) and a second soundscaping prediction model 120-2 (e.g., labelled "Model2 in FIG. 1, for simplicity) (e.g., soundscaping prediction models 120 and/or a soundscaping prediction model 120), respectively associated with the first environment 108-1 and the second environment 108-2, for example via respective identifiers 122-1, 122-2 (e.g., the identifiers 122, and/or an identifier 122) thereof. Association between a soundscaping prediction models 120 and associated identifiers 122 are indicated in FIG. 1 via dashed lines therebetween.

For clarity, the first identifier 122-1 identifies the first environment 108-1 via text "Stairway" and the second identifier 122-2 identifies the second environment 108-2 via text "Ballroom", though the identifiers 122 may be any suitable alphanumeric identifiers. For example, it is appreciated that the first camera 104-1 may be associated with the first identifier 122-1 such that the first camera 104-1 provides the first identifier 122-1 with respective video and respective audio provided to the computing device 102, and, similarly, the second camera 104-2 may be associated with the second identifier 122-2 such that the second camera 104-2 provides the second identifier 122-2 with respective video and respective audio provided to the computing device 102. Hence the computing device 102, having received respective video and/or audio from a camera 104 may identify a respective soundscaping prediction model 120 accordingly.

While only two soundscaping prediction models 120 and associated identifiers 122 are depicted, the memory 118 may store any suitable number of soundscaping prediction models 120 and associated identifiers 122, for example corresponding to a number of the environments 108 of the system 100.

The soundscaping prediction models 120 may be generated by the computing device 102, or generated by another computing device (not depicted) and preconfigured at the memory 118 accordingly. An example of generation of soundscaping prediction models 120 is described herein with respect to FIG. 4.

The soundscaping prediction models 120 generally indicate how respective environmental acoustic modifier features 112, 114 (and optionally environmental acoustic modifier features 116) may alter a sound generated in a respective environment 108.

For example, the first soundscaping prediction model 120-1 may represent how the metal staircase and the brick walls of the first environmental acoustic modifier features 112-1 may alter footsteps in the first environment 108-1 and, similarly, the second soundscaping prediction model 120-2 may represent how the carpet and the wooden walls of the second environmental acoustic modifier features 112-2 may alter footsteps in the second environment 108-2. The second soundscaping prediction model 120-2 may not take the other environmental acoustic modifier features 116 into account, as such environmental acoustic modifier features 116 may be temporary and/or may not always be present in the second environment 108-2 (though, for example, the second soundscaping prediction model 120-2 may take the physical features of the HVAC outlet into account, which may be permanent, but not sounds emitted by the HVAC outlet).

It is understood that the soundscaping prediction models 120 may be generated in any suitable manner as known to a person of skill in the art, and may comprise respective machine learning models trained to perform functionality as described herein.

For example, the first soundscaping prediction model may comprise a first machine learning model and/or acoustic AI model trained to extract sound signatures of given types from audio based on first environmental acoustic modifier features 112-1 present at the first environment 108-1 of the first camera 104-1. Similarly, the second soundscaping prediction model 120-2 may comprises a second machine learning model and/or acoustic AI model trained to output soundscaped signatures of given types from audio based on second environmental acoustic modifier features 114-2 present at the second environment 108-2 of the second camera 108-2.

In some examples, the soundscaping prediction models 120 may be trained to both extract sound signatures and output soundscaped signatures, for example depending on what is input to the soundscaping prediction models 120 and/or an operating mode of the soundscaping prediction models 120. However, in other examples, the soundscaping prediction models 120 may comprise respective soundscape models for extracting sound signatures and outputting soundscaped signatures. Hence, while for simplicity, only one soundscaping prediction model 120 is associated a given identifier 122, a given identifier 122 may be associated with one or more respective soundscaping prediction models 120 for extracting sound signatures and outputting soundscaped signatures.

It is further understood that a soundscaping prediction model 120 may comprise different layers for different sound types input to the soundscaping prediction model 120. For example, as described herein, footsteps of the OOI 110 will be used to explain operation of the system 100, and hence, the soundscaping prediction models 120 may include respective layers dedicated to footsteps. However, the soundscaping prediction model 120 may include other layers dedicated to other types of sounds made by an OOI, such as jangling keychains, jangling necklaces, singing, shouting, breathing, and the like.

Indeed, while the depicted OOI 110 is a person, OOIs as described herein may include any suitable type of OOI that may move between environments where cameras are deployed. For example an OOI may include, but is not limited to, animals, robots, drones, vehicles and the like, with different layers of the soundscaping prediction model 120 corresponding to different types of sounds made by respective OOIs. Indeed, while present examples are described with respect to environments of buildings, environments as described herein may include any suitable types of environments at which cameras are deployed and in communication with the computing device 102, including, but not limited to, parking lots, parks, streets, and the like.

The system 100 may comprise any other suitable components. For example, as depicted, the computing device 102 is in communication with one or more optional sensors 124-1, 124-2 (e.g., sensors 124 and/or a sensor 124) deployed in respective environments 108, though such sensors 124 may be deployed in one environment 108, but not another. The sensors 124 may comprise any suitable sensors for detecting the environmental acoustic modifier features 112, 114, 116, and/or acoustic signatures thereof, and may include, but is not limited to, such as microphones, directional microphones, radar devices, LIDAR (Light Detection and Ranging) devices, and the like, which may be separate from the cameras 104 (e.g., as depicted) and/or one or more of the sensors 124 may be incorporated into a respective camera 104 at a respective environment 108.

While not depicted, the cameras 104 may respectively comprise, or be collocated with, respective processing resources and/or computing devices and/or analytics engines (e.g., in a system-on-chip architecture), which may perform at least a portion of the function of the computing device 102 as described herein. For example, the computing device 102 may comprise a cloud computing device, or more than one cloud computing device. Furthermore, an analytics engine of a camera 104 may be located, or at least partially located, at a camera 104, and/or be hosted, or at least partially hosted, at the computing device 102. Regardless, while certain functionality of the system 100 is described herein with respect to the computing device 102, such functionality may be distributed between the computing device 102 and one or more of the cameras 104. Such functionality is next described.

In particular, as depicted, the computing device 102 may comprise and/or operate various engines for implementing certain functionality. For example, as depicted, the computing device 102 comprises: a soundscaping prediction model generation engine 130, an OOI detection engine 140, a sound type detection engine 150, a comparison engine 160 and a change configuration engine 170. However, one or more of such engines 130, 140, 150, 160, 170 may be optional and/or functionality of one or more of such engines 130, 140, 150, 160, 170 may be combined in any suitable manner. Furthermore, one or more of the such engines 130, 140, 150, 160. 170 may be implemented using machine learning algorithms and the like, or one or more of such engines 130, 140, 150, 160, 170 may be implemented using programmatic algorithms.

Figure 4:
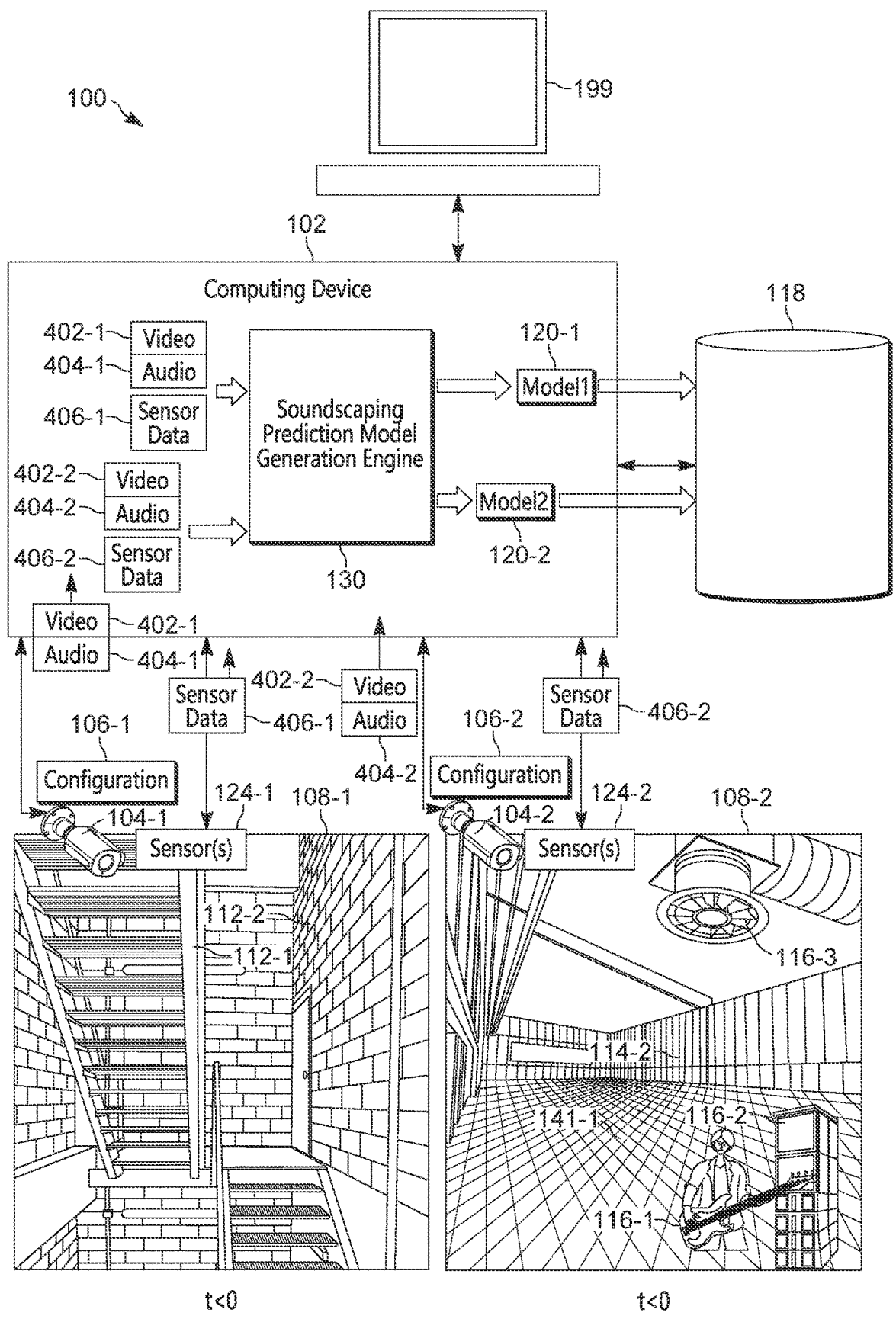
FIG. 4 depicts the system of FIG. 1 implementing a method for detecting objects of interest using soundscaped signatures, in accordance with some examples.

The soundscaping prediction model generation engine 130 may be optional, for example, and, when present, may be used to generate one or more of the soundscaping prediction models 120, as described with respect to FIG. 4.

The OOI detection engine 140 and the sound type detection engine 150 may be used to respectively identify, using first video or first audio from the first camera 104-1, the OOI 110, and a sound type of a sound made by the OOI 110. Such identification may occur via video analysis and/or audio analysis of first video or first audio from the first camera 104-1. The OOI detection engine 140 and the sound type detection engine 150 may hence comprise any suitable video analytics and/or audio analytics for implementing such functionality, which may include, but is not limited to, machine learning-based video analytics and/or audio analytics for identifying OOIs, using video or audio from a camera, and identifying a sound type of a sound made by an OOI.

The computing device 102 may generate a sound signature of the OOI 110 from the first audio from the first camera 104-1, using the sound type and the first soundscaping prediction model 120-1. For example, the sound signature may represent a sound of footsteps of the OOI 110 isolated from other sounds of the first audio influenced by the first environmental acoustic modifier features 112.

The computing device 102 generates a soundscaped signature of the OOI 110, which predicts a modification of the sound signature (e.g., of the footsteps) in the second environment 108-1 of the second camera 104-2. The soundscaped signature is generated by inputting the sound signature and the sound type into the second soundscaping prediction model 120-2. For example, a modification of the sound signature is understood to be different in the different environments 108 (e.g. due to different acoustic modifiers being present in the different environments 108), and the soundscaped signature of the OOI 110 is understood comprises a prediction of how the sound signature may change in the second environment 108-1 of the second camera 104-2 due the carpet, the wood walls, and the like.

The computing device 102 may deploy the soundscaped signature of the OOI 110 to the second camera 104-2 for use by an analytics engine thereof, or the computing device 102 may monitor second audio received from the second camera 104-2 using, for example, the comparison engine 160. Either way, the second camera 104-2, and/or the computing device 102, may compare the soundscaped signature with audio acquired by the second camera 104-2 to detect the soundscaped signature in such audio, for example to detect the OOI 110 when the OOI 110 does not appear in video acquired by the second camera 104-2.

Hence, the computing device 102, or another computing device (e.g., at the second camera 104-1) may detect the soundscaped signature of the OOI 110 in second audio from the second camera 104-2, and generate a notification that the OOI 110 was detected at a location of the second camera 104-2. For example, as also depicted in FIG. 1, the computing device 102 may be in communication with a terminal 199, and/or any other suitable notification device, which may be used to provide security notifications, and optionally implement some action on the basis of receiving a notification of an OOI, such as deploying security personal to the location of the second camera 104-2, and the like.

The change configuration engine 170 may be optional and, when present, may be used to change a configuration 106 of a camera 104, such as the configuration 106-2 of the second camera 104-2, for example to better detect the soundscaped signature of the OOI 110 in second audio from the second camera 104-2. An example of such a change is described herein with respect to FIG. 8.

Figure 2:
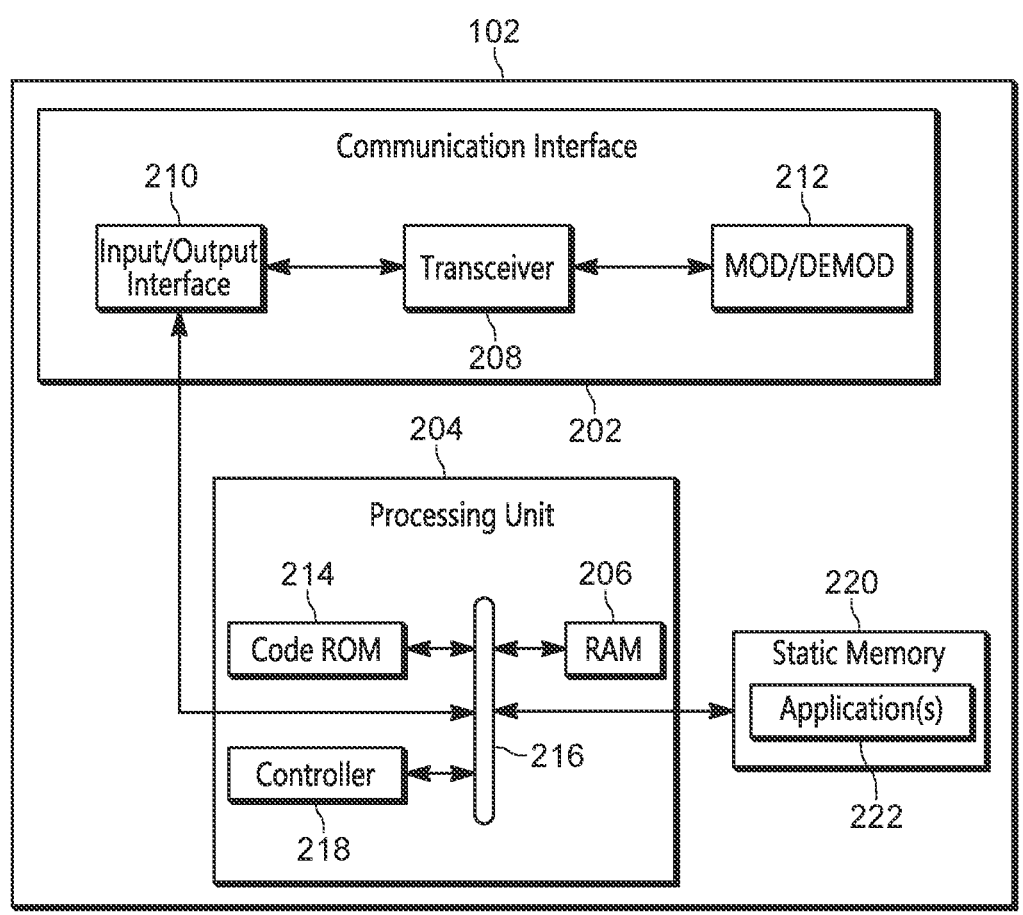
FIG. 2 is a device diagram showing a device structure of a device for detecting objects of interest using soundscaped signatures, in accordance with some examples.

Attention is next directed to FIG. 2, which depicts a schematic block diagram of an example of the computing device 102. As depicted, the computing device 102 comprises: a communication unit 202, a processing unit 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include one or more of an input device and a display screen and the like.

As shown in FIG. 2, the computing device 102 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100, such as the cameras 104, the memory 118 and the sensors 124. For example, the communication unit 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for detecting objects of interest using soundscaped signatures. For example, in some examples, the computing device 102 and/or the controller 218 specifically comprises a computer executable engine configured to implement functionality for detecting objects of interest using soundscaped signatures (e.g., which may combine one or more of the engines 130, 140, 150, 160, 170).

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
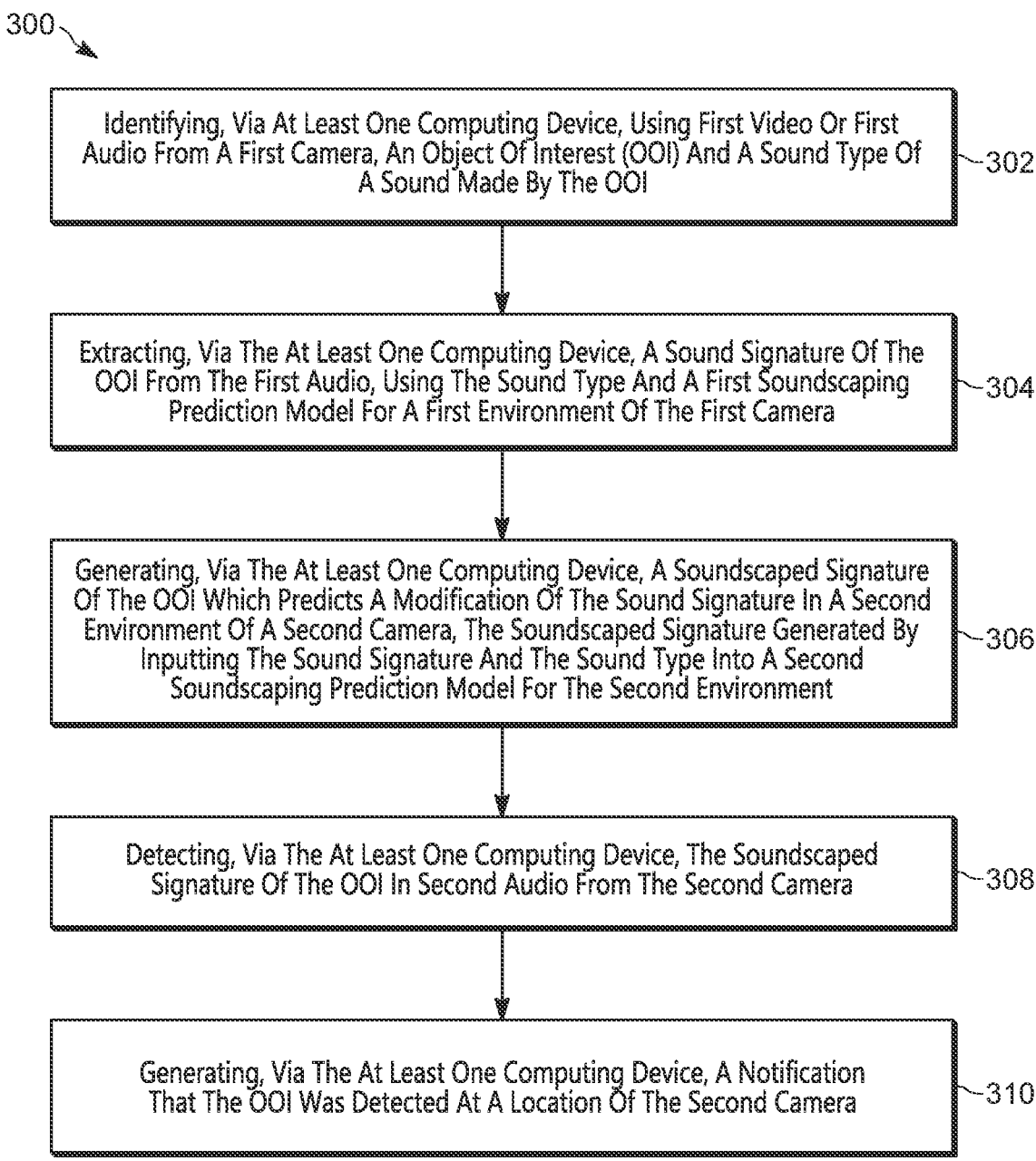
FIG. 3 is a flowchart of a method for detecting objects of interest using soundscaped signatures, in accordance with some examples.

In particular, the memory 220 stores instructions corresponding to the at least one application 222 that, when executed by the controller 218, enables the controller 218 to implement functionality for detecting objects of interest using soundscaped signatures, including but not limited to, the blocks of the methods set forth in FIG. 3.

Furthermore, the at least one application 222 may comprise instructions for implementing the engines 130, 140, 150, 160, 170.

The application 222 may include programmatic algorithms, and the like, to implement functionality as described herein.

Furthermore, the application 222 may comprise the soundscaping prediction models 120 and the identifiers 122, for example as modules of the application 222.

Alternatively, and/or in addition to programmatic algorithms, the application 222 may include one or more machine learning algorithms to implement functionality as described herein.

The one or more machine learning algorithms of the application 222 and/or the soundscaping prediction models 120 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

Attention is now directed to FIG. 3, which depicts a flowchart representative of a method 300 for detecting objects of interest using soundscaped signatures. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way in which the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218 and/or the computing device 102 identifies, using first video or first audio from a first camera 104-1, an object of interest (OOI 110) 110 and a sound type of a sound made by the OOI 110.

At a block 304, the controller 218 and/or the least one computing device 102 extracts a sound signature of the OOI 110 from the first audio, using the sound type and a first soundscaping prediction model 120-1 for a first environment 108-1 of the first camera 104-1.

At a block 306, the controller 218 and/or the least one computing device 102 generates a soundscaped signature of the OOI 110, which predicts a modification of the sound signature in a second environment 108-1 of a second camera 104-2, the soundscaped signature generated by inputting the sound signature and the sound type into a second soundscaping prediction model 120-2 for the second environment 108-1;

At a block 306, the controller 218 and/or the least one computing device 102 detects the soundscaped signature of the OOI 110 in second audio from the second camera 104-2.

At a block 308, the controller 218 and/or the least one computing device 102 generates a notification that the OOI 110 was detected at a location of the second camera 104-2.

The method 300 may comprise other features.

For example, the method 300 may further comprise the controller 218 and/or the least one computing device 102: adjusting a configuration 106-2 of the second camera 104-2 based on the soundscaped signature of the OOI 110.

For example, the soundscaped signature may include particular frequencies, and the like, and the controller 218 and/or the least one computing device 102 may adjust the configuration 106-2 of the second camera 104-2 such that a microphone thereof is more sensitive to such particular frequencies.

Put another way, the method 300 may further comprise the controller 218 and/or the least one computing device 102: adjusting a configuration 106-2 of the second camera 104-2 based on the soundscaped signature of the OOI 110 by adjusting sensitivity to frequencies identified in the soundscaped signature (e.g., using an equalizer of the second camera 104-2, and the like).

Alternatively, or in addition, the controller 218 and/or the least one computing device 102 may adjust the configuration 106-2 of the second camera 104-2 to adjust beamforming parameters thereof, for example to control sensitivity of a microphone thereof in a direction of the OOI 110 (e.g., a direction in which sounds made by an OOI 110 are detected). PTZ parameters defined by the configuration 106-2 may also be adjusted, for example to point the second camera 104-2 and/or a microphone thereof, in a direction of the OOI 110.

In some examples, the method 300 may further comprise the controller 218 and/or the least one computing device 102: extracting the sound signature of the OOI 110 from the first audio by inputting the first audio and the sound type into the first soundscaping prediction model 120-1, the first soundscaping prediction model 120-1 comprising a first machine learning model trained to extract sound signatures of given types from audio based on first environmental acoustic modifier features 112 present at the first environment 108-1 of the first camera 104-1.

Similarly, the second soundscaping prediction model 120-2 may comprise a second machine learning model trained to output soundscaped signatures of given types from audio based on second environmental acoustic modifier features 114 present at the second environment 108-1 of the second camera 104-2.

In some examples, the method 300 may further comprise the controller 218 and/or the least one computing device 102: generating the first soundscaping prediction model 120-1 and the second soundscaping prediction model 120-2 based on environmental acoustic modifier features present at respective locations of the first camera 104-1 and the second camera 104-2.

For example, the method 300 may further comprise the controller 218 and/or the least one computing device 102: generating the first soundscaping prediction model 120-1 and the second soundscaping prediction model 120-2 by detecting environmental acoustic modifier features 112, 114 present at respective locations of the first camera 104-1 and the second camera 104-2, the detecting occurring using one or more of: respective video from the first camera 104-1 and the second camera 104-2; microphones and multidirectional speakers (e.g., the sensors 124) at the respective locations; and respective sensors (e.g., the sensors 124) at the respective locations.

For example, using respective video from the first camera 104-1 and the second camera 104-2; microphones and multidirectional speakers (e.g., the sensors 124) at the respective locations; and respective sensors (e.g., the sensors 124) at the respective locations, and the soundscaping prediction model generation engine 130, the soundscaping prediction models 120 may be generated by inputting, to the soundscaping prediction model generation engine 130 video and/or audio and/or sensor data collected at the environments 108, and the soundscape soundscaping prediction model generator may output the soundscaping prediction models 120.

In some examples, the method 300 may further comprise the controller 218 and/or the least one computing device 102: detecting (e.g., at the block 308) in the second audio from the second camera 104-2, the soundscaped signature of the OOI 110, by: comparing the soundscaped signature with the second audio.

In some examples, the method 300 may further comprise the controller 218 and/or the least one computing device 102: generating a score associated with detecting the soundscaped signature of the OOI 110 in the second audio from the second camera 104-2; and generating the notification (e.g., at the block 310) only when the score is greater than a threshold score.

For example, detection of the soundscaped signature of the OOI 110 in the second audio from the second camera 104-2 may occur using one or more machine learning algorithms, for example using the comparison engine 160, which may output a score of a comparison between the soundscaped signature with the second audio, for example in a range of 0 to 100, with 0 representing no, or a lowest, match between the soundscaped signature with the second audio, and 100 representing a perfect, or highest, match between the soundscaped signature with the second audio. Hence, scores less than 50 indicate that it is unlikely that the soundscaped signature matches the second audio from the second camera 104-2, and scores greater than 50 indicate that it is more likely that the soundscaped signature matches the second audio from the second camera 104-2. Such a score may alternatively be referred to as a matching comparison confidence score.

Hence, a threshold score may be selected that is greater than 50, such as 70, 80, 90, and the like, and a notification may be generated when the score is greater than the threshold score. For example, the notification may be provided to the terminal 199, and provided at an output device thereof, such as a display screen, a speaker, and the like, which may cause security personnel to be deployed to the location of the second camera 104-2, where the OOI 110 may be located.

Alternatively, or in addition, the notification may comprise a software trigger, that triggers hardware of the system 100 to provide an alarm, for example indicating that the OOI 110 is at a building, and the like, where the cameras 104 are deployed. In particular, and returning to the block 302, the controller 218 and/or the at least one computing device 102 may be configured to identify certain types of OOIs in video and/or audio from cameras 104, and such types may include persons, and the like, not authorized to be at the building (e.g., an intruder), and/or such persons may be suspects in a crime, and the like. For example, the OOI 110 may be an intruder. Hence, the aforementioned alarm may notify occupants of the second environment 108-2, and/or environments and/or room adjacent the second environment 108-2, to evacuate in response to detecting the OOI 110 via the soundscaped signature at the second environment 108-2 In a particular example, the OOI 110 may be trying to avoid being in a field of view of the cameras 104, and detecting the soundscaped signature of the OOI 110 in second audio from the second camera 104-2, which may cause an alarm to be triggered, may ensure that the OOI 110 is detected in such situations.

Hence, in some examples, the OOI 110 may be absent in second video of the second camera 104-2 and the soundscaped signature may be present in the second audio of the second camera 104-2.

Attention is next directed to FIG. 4, FIG. 5, FIG. 6, FIG. 7, and FIG. 8, which depict an example of the method 300. FIG. 4, FIG. 5, FIG. 6, FIG. 7, and FIG. 8 are similar to FIG. 1, with like components having like numbers.

Furthermore, while not all components of the system 100 are depicted in FIG. 4, FIG. 5, FIG. 6, FIG. 7, and FIG. 8 for simplicity, such components may nonetheless be present. In particular, not all engines 130, 140, 150, 160, 170 are depicted in all of FIG. 4, FIG. 5, FIG. 6, FIG. 7, and FIG. 8, but may nonetheless be present. Furthermore, flow of data between components of the system 100 is depicted in FIG. 4, FIG. 5, FIG. 6, FIG. 7, and FIG. 8 using hollow arrows.

Attention is first directed to FIG. 4, which depicts the system 100 prior to the OOI 110 entering either of the environments 108 and prior to the soundscaping prediction models 120 being generated (e.g., at a time, t<0, as compared to FIG. 1). As depicted, the computing device 102 is receiving video 402-1 and audio 404-1 from the first camera 104-1, respective video 402-2 and audio 404-2 from the second camera 104-2, and, optionally, respective sensor data 406-1, 406-2 from the sensors 124-1, 124-2.

The computing device 102 uses, as input to the soundscaping prediction model generation engine 130, the video 402-1 and audio 404-1 from the first camera 104-1 and the sensor data 406-1 from the first sensor(s) 124-1, to generate the first soundscaping prediction model 120-1, which is stored in the memory 118, for example in association with the identifier 122-1 (e.g., as depicted in FIG. 1).

Similarly, the computing device 102 uses, as input to the soundscaping prediction model generation engine 130, the video 402-2 and audio 404-2 from the second camera 104-2 and the sensor data 406-2 from the second sensor(s) 124-2, to generate the second soundscaping prediction model 120-2, which is stored in the memory 118, for example in association with the identifier 122-2 (e.g., as depicted in FIG. 1).

It is understood that the soundscaping prediction models 120-1, 120-2 are generated separate from each other. For example, the video and audio 402-1 from the first camera 104-1 and the sensor data 406-1 from the first sensor(s) 124-1 may be first input to the soundscaping prediction model generation engine 130 to generate the first soundscaping prediction model 120-1, and the video and audio 402-2 from the second camera 104-2 and the sensor data 406-2 from the second sensor(s) 124-2 may be later input to the soundscaping prediction model generation engine 130 to generate the second soundscaping prediction model 120-2. However, generation of the soundscaping prediction models 120-1, 120-2 may occur in any suitable order.

Furthermore, while the identifiers 122 are not depicted in FIG. 1, it is understood that respective identifiers 122 may be received with the video 402 and audio 404, and the sensor data 406, for example as metadata, and associated with the soundscaping prediction models 120.

Furthermore, it is understood that the soundscaping prediction model generation engine 130 may incorporate any suitable algorithms and/or techniques to generate the soundscaping prediction models 120 and such algorithms and/or techniques may be generally known to persons of skill in the art, such that the soundscaping prediction models 120 represent a soundscape of the environments 108 according to detected respective environmental acoustic modifier features 112, 114, for example detected using the video 402, audio 404, and/or the sensor data 406

Figure 5:
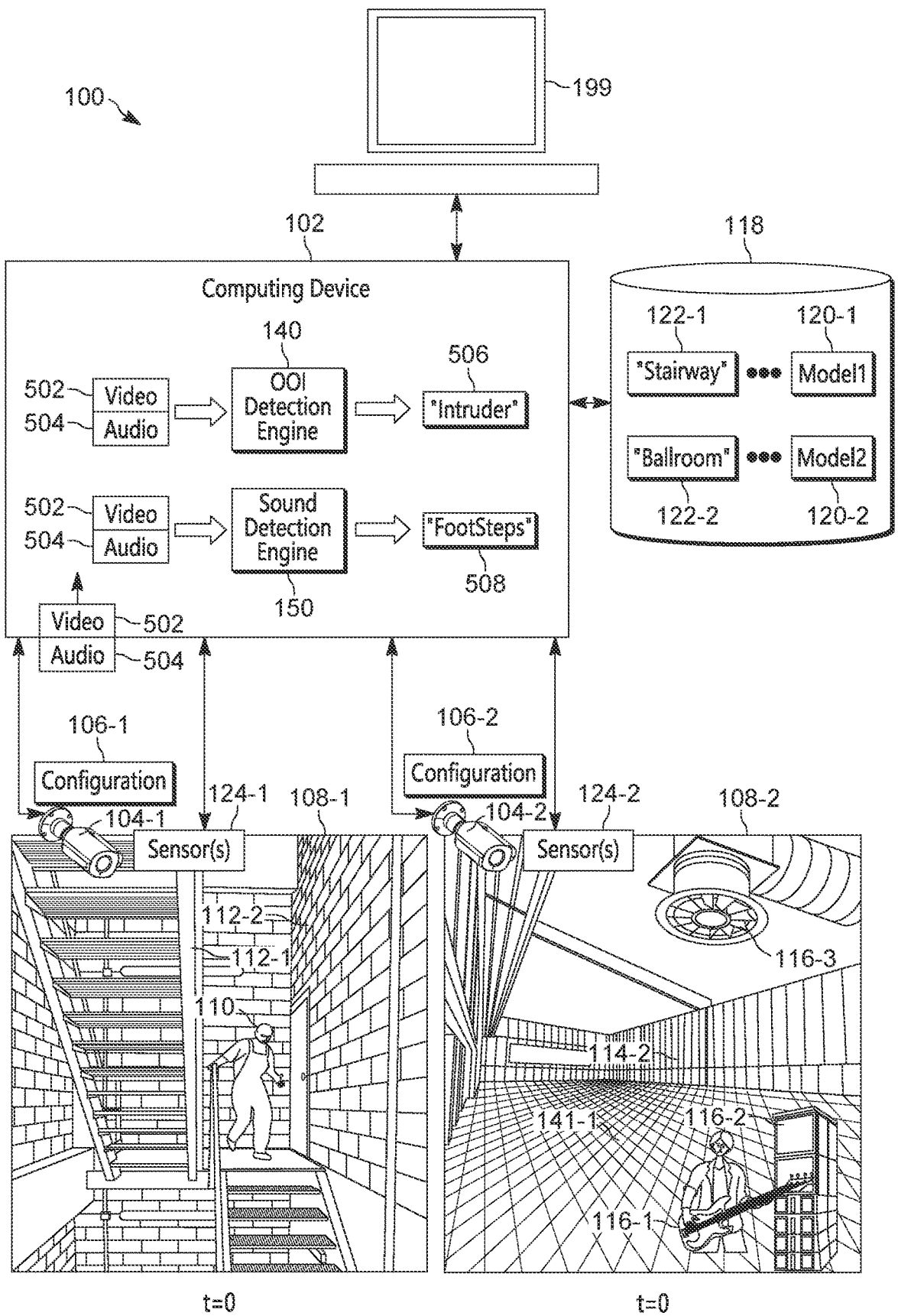
FIG. 5 depicts the system of FIG. 1 continuing to implement the method for detecting objects of interest using soundscaped signatures, in accordance with some examples.

Attention is next directed to FIG. 5, which is understood to be at a time, t=0 (e.g., similar to FIG. 1), and which shows the soundscaping prediction model 120 stored in the memory 118 in association with the identifier 122. Furthermore, in FIG. 5 the OOI 110 is on the metal stairs of the first environment 108-1. Video 502 and audio 504 is received from the first camera 104-1 and is used as input to the OOI detection engine 140, for example to identify any OOIs via the video 502 and/or the audio 504 at the first environment 108-1. While not depicted, video and audio from the second camera 104-2 may continue to be received, and may also be used as input to the OOI detection engine 140, for example to identify any OOIs at the second environment 108-2.

As depicted, the computing device 102 and/or the OOI detection engine 140 identifies the OOI 110 (e.g., at the block 302 of the method 300) and outputs an identifier 506 thereof, for example, as depicted an identifier 506 of an "Intruder" though any suitable identifier 506 may be assigned to the OOI 110.

As depicted, the video 502 and audio 504 are also used as input to the sound type detection engine 150 to identify (e.g., at the block 302 of the method 300) a sound type 508 of the OOI 110. For example, as depicted, the sound type 508 is identified as "Footsteps".

In some examples, identifying the sound type 508 may not occur until the OOI 110 is identified and/or the sound type 508 may be identified in response to identifying the OOI 110. In other examples, identifying the sound type 508 may occur in parallel with and/or in conjunction with identifying the OOI 110.

It is further understood that the computing device 102 determines that the OOI 110 was detected in the first environment 108-1 associated with the identifier 122-1.

Figure 6:
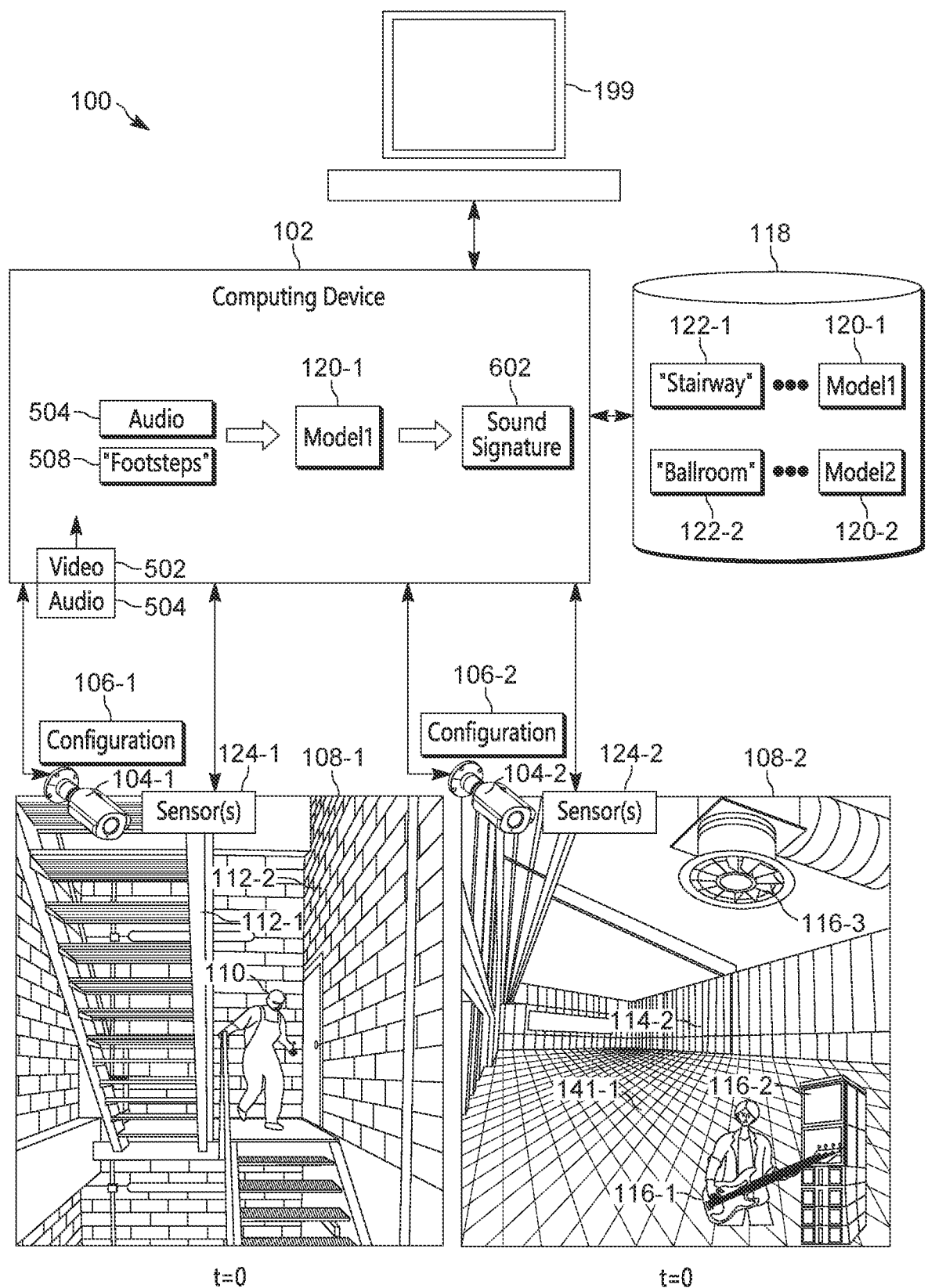
FIG. 6 depicts the system of FIG. 1 continuing to implement the method for detecting objects of interest using soundscaped signatures, in accordance with some examples.

Attention is next directed to FIG. 6, which may also occur at the time, t=0, or shortly thereafter, or at least after identifying the OOI 110 and the sound type 508. As depicted, the computing device 102 retrieves the first soundscaping prediction model 120-1 from the memory 118 using the identifier 118-1. The computing device 102 extracts (e.g., at the block 304 of the method 300) a sounds signature 602 of the OOI 110 by inputting, to the first soundscaping prediction model 120-1, the audio 504 from the first camera 104-1 and the sound type 508 of "Footsteps". While not depicted, the sounds signature 602 may be labelled with the identifier 506 of the OOI 110 such that the identifier 506 may be used to associate the sounds signature 602 with other data in the system 100.

As has already been described, the sounds signature 602 represents a sound of the footsteps of the OOI 110 in the absence of the first environmental acoustic modifier features 112 of the first environment 108-1. For example, frequencies due to echo, reverberation, and the like, may be removed from the audio 504 that occurred due the metal staircase, brick walls etc.

Figure 7:
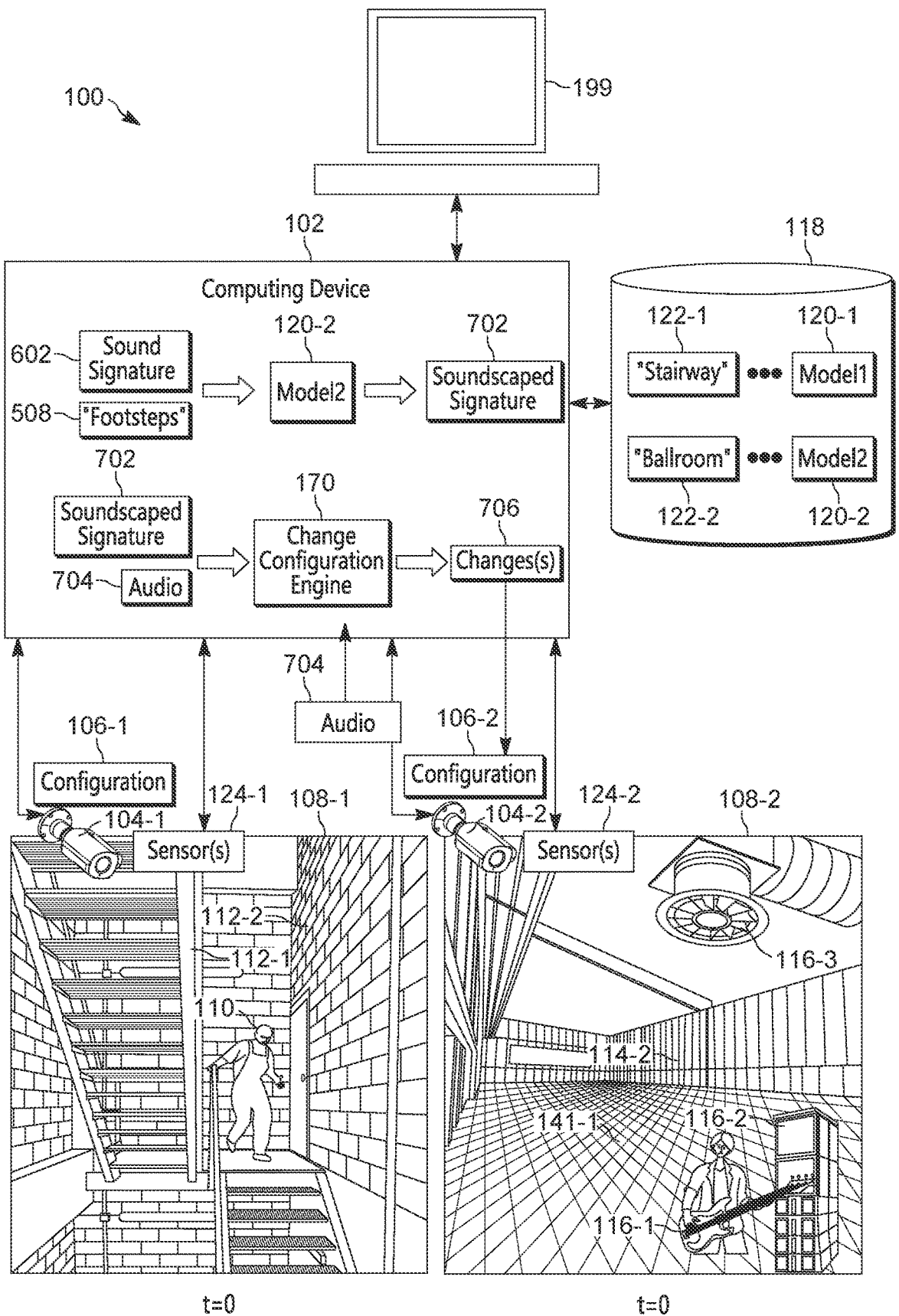
FIG. 7 depicts the system of FIG. 1 continuing to implement the method for detecting objects of interest using soundscaped signatures, in accordance with some examples.

Attention is next directed to FIG. 7, which may also occur at the time, t=0, or shortly thereafter, or at least after extracting the sound signature 602. As depicted, the computing device 102 generates (e.g., at the block 306 of the method 300) a soundscaped signature 702 of the OOI 110, by using, as input to the second soundscaping prediction model 120-2 (e.g., retrieved from the memory 118), the sound signature 602 and the sound type 508. When the system 100 includes more than two cameras 104 in more than two environments 108, the computing device 102 may generate a respective soundscaped signature of the OOI 110 for each environment 108 (e.g., that is not the environment 108 where the OOI 110 was detected).

As has already been described, the soundscaped signature 702 predicts a modification of the sound signature 602 in the second environment 108-2 of the second camera 104-2 and/or in the presence of the second environmental acoustic modifier features 114 of the second environment 108-2. For example, frequencies due to echo, reverberation, and the like, may be added to the sound signature 602 that are predicted to occur due to the carpet, wood walls etc.

While not depicted, the soundscaped signature 702 may be identified via the identifier 506 of the OOI 110.

As an optional feature, once the soundscaped signature 702 is generated, the computing device 102 may use, as input to the change configuration engine 170, the soundscaped signature 702 and, optionally, audio 704 from the second camera 104-2, to determine frequencies, and the like, of the soundscaped signature 702, and optionally frequencies, and the like, of the audio 704. The change configuration engine 170 may generate changes 706 to the configuration 106-2 of the second camera 104-2 based on the frequencies, and the like, of the soundscaped signature 702, and optionally the frequencies, and the like, of the audio 704.

The changes 706 may tune and/or change a sensitivity of a microphone of the second camera 108-2 to be more sensitive to frequencies of the soundscaped signature 702 than frequencies of the audio 704. For example, the audio 704 may include frequencies from the bass guitar, the woofer speaker and/or the HVAC outlet, which may be adjacent to frequencies of the soundscaped signature 702, and the changes 706 may enable a microphone of the second camera 104-2 to better distinguish the frequencies of the soundscaped signature 702 and respective frequencies of the audio 704. Alternatively, or in addition, the changes 706 may enable the second camera 104-2 to filter the frequencies of the audio 704 from later audio received at a microphone of the second camera 104-2. The changes 706 may further control an equalizer of the second camera 104-2. Metadata of the audio 704 may include the identifier 122-2.

While not depicted, the change configuration engine 170 may receive, as input, video from the second camera 104-2, and/or continue to receive, as input, audio from the second camera 104-2, for example to detect a location of the OOI 110, if and/or when the OOI 110 enters the second environment 108-2, such that beamforming of a microphone of the second camera 104-2, and/or PTZ of the second camera 104-2 may be controlled via further changes 706 to the configuration 106-2 of the second camera 104-2, to better detect sounds of the OOI 110 at the location of the OOI 110.

Furthermore, such changes in configuration may occur for any camera 104 of the system 100 for which a respective soundscaped signature of the OOI 110 was generated.

Figure 8:
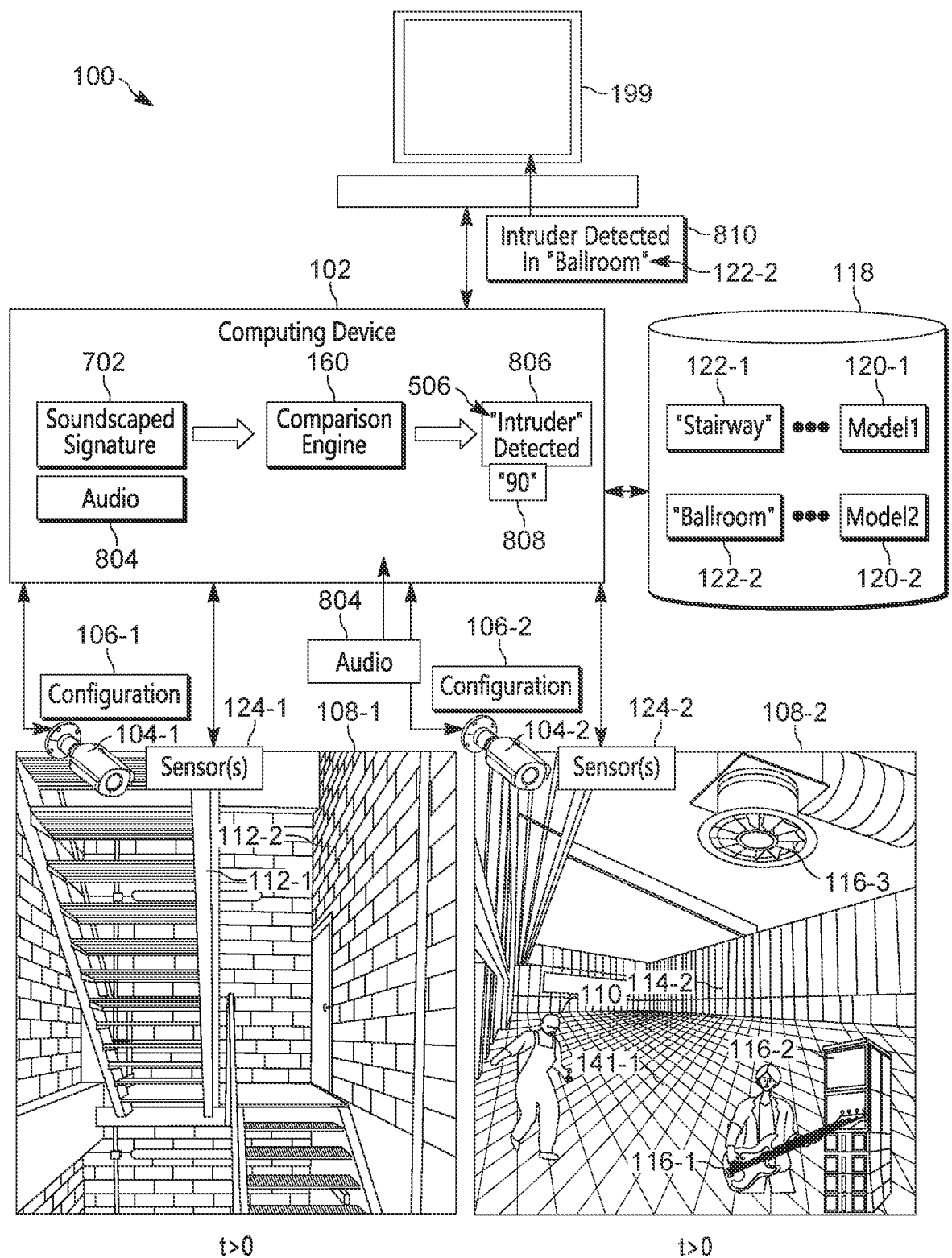
FIG. 8 depicts the system of FIG. 1 continuing to implement the method for detecting objects of interest using soundscaped signatures, in accordance with some examples.

Attention is next directed to FIG. 8, which may occur at the time, t>0, such that the OOI 110 has left the first environment 108-1 and entered the second environment 108-2 (e.g., as was also depicted in FIG. 1).

As depicted, the computing device 102 is receiving audio 804 from the second camera 104-2, and the audio 804 is understood to include sounds of footsteps of the OOI 110 as modified by the second environmental acoustic modifier features 114. The audio 804 may further include sounds from the other environmental acoustic modifier features 116, but which may be filtered, using the configuration 106-2 and/or frequencies of the sounds of footsteps of the OOI 110 may be increased, relative to frequencies of sounds from the other environmental acoustic modifier features 116 on the basis of the aforementioned changes 706. Metadata of the audio 804 may include the identifier 122-2.

As depicted, the computing device 102 detects (e.g., at the block 308 of the method 300) the soundscaped signature 702 of the OOI 110 in the audio 804 from the second camera 104-2 by inputting the soundscaped signature 702 and the audio 804 to the comparison engine 160. As depicted, the comparison engine 160 generates output 806 indicating that the OOI 110 identified by the identifier 506 "Intruder" was "Detected" in in the audio 804 from the second camera 104-2, and further outputs a matching comparison confidence score 808 of "90".

Presuming the score 808 of "90" is above (or equal to) a threshold score (e.g., of "80"), the computing device 102 generates (e.g., at the block 310 of the method 300) a notification 810 indicating that the OOI 110 of an "Intruder" was detected in the "Ballroom" (e.g., as identified by the identifier 122-2). The notification 810 may be provided to the terminal 199 and any suitable electronic remedial action may occur, such as activation of an alarm, dispatch of security personnel to second environment 108-2, and the like.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, generate soundscaped signatures, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    identifying, via at least one computing device, using first video or first audio from a first camera, an object of interest (OOI) and a sound type of a sound made by the OOI;
    extracting, via the at least one computing device, a sound signature of the OOI from the first audio, using the sound type and a first soundscaping prediction model for a first environment of the first camera;
    generating, via the at least one computing device, a soundscaped signature of the OOI which predicts a modification of the sound signature in a second environment of a second camera, the soundscaped signature generated by inputting the sound signature and the sound type into a second soundscaping prediction model for the second environment;
    detecting, via the at least one computing device, the soundscaped signature of the OOI in second audio from the second camera; and
    generating, via the at least one computing device, a notification that the OOI was detected at a location of the second camera.

2. The method of claim 1, further comprising:
    adjusting a configuration of the second camera based on the soundscaped signature of the OOI.

3. The method of claim 1, further comprising:
    adjusting a configuration of the second camera based on the soundscaped signature of the OOI by adjusting sensitivity to frequencies identified in the soundscaped signature.

4. The method of claim 1, further comprising:
    extracting the sound signature of the OOI from the first audio by inputting the first audio and the sound type into the first soundscaping prediction model, the first soundscaping prediction model comprising a first machine learning model trained to extract sound signatures of given types from audio based on first environmental acoustic modifier features present at the first environment of the first camera.

5. The method of claim 1, wherein the second soundscaping prediction model comprises a second machine learning model trained to output soundscaped signatures of given types from audio based on second environmental acoustic modifier features present at the second environment of the second camera.

6. The method of claim 1, further comprising:
    generating the first soundscaping prediction model and the second soundscaping prediction model based on environmental acoustic modifier features present at respective locations of the first camera and the second camera.

7. The method of claim 1, further comprising:
    generating the first soundscaping prediction model and the second soundscaping prediction model by detecting environmental acoustic modifier features present at respective locations of the first camera and the second camera, the detecting occurring using one or more of: respective video from the first camera and the second camera; microphones and multidirectional speakers at the respective locations; and respective sensors at the respective locations.

8. The method of claim 1, further comprising:
    detecting in the second audio from the second camera, the soundscaped signature of the OOI, by comparing the soundscaped signature with the second audio.

9. The method of claim 1, further comprising:
generating a score associated with detecting the soundscaped signature of the OOI in the second audio from the second camera; and
generating the notification only when the score is greater than a threshold score.

10. The method of claim 1, wherein the OOI is absent in second video of the second camera and the soundscaped signature is present in the second audio of the second camera.

11. A device comprising:
a communication interface; and
a controller in communication with a first camera and second camera, the controller configured to:
identify, using first video or first audio from the first camera, an object of interest (OOI) and a sound type of a sound made by the OOI;
extract a sound signature of the OOI from the first audio, using the sound type and a first soundscaping prediction model for a first environment of the first camera;
generating a soundscaped signature of the OOI which predicts a modification of the sound signature in a second environment of the second camera, the soundscaped signature generated by inputting the sound signature and the sound type into a second soundscaping prediction model for the second environment;
detect the soundscaped signature of the OOI in second audio from the second camera; and
generate a notification that the OOI was detected at a location of the second camera.

12. The device of claim 11, wherein the controller is further configured to:
adjust a configuration of the second camera based on the soundscaped signature of the OOI.

13. The device of claim 11, wherein the controller is further configured to:
adjust a configuration of the second camera based on the soundscaped signature of the OOI by adjusting sensitivity to frequencies identified in the soundscaped signature.

14. The device of claim 11, wherein the controller is further configured to:
extract the sound signature of the OOI from the first audio by inputting the first audio and the sound type into the first soundscaping prediction model, the first soundscaping prediction model comprising a first machine learning model trained to extract sound signatures of given types from audio based on first environmental acoustic modifier features present at the first environment of the first camera.

15. The device of claim 11, wherein the second soundscaping prediction model comprises a second machine learning model trained to output soundscaped signatures of given types from audio based on second environmental acoustic modifier features present at the second environment of the second camera.

16. The device of claim 11, wherein the controller is further configured to:
generate the first soundscaping prediction model and the second soundscaping prediction model based on environmental acoustic modifier features present at respective locations of the first camera and the second camera.

17. The device of claim 11, wherein the controller is further configured to:
generate the first soundscaping prediction model and the second soundscaping prediction model by detecting environmental acoustic modifier features present at respective locations of the first camera and the second camera, the detecting occurring using one or more of: respective video from the first camera and the second camera; microphones and multidirectional speakers at the respective locations; and respective sensors at the respective locations.

18. The device of claim 11, wherein the controller is further configured to:
detect, in the second audio from the second camera, the soundscaped signature of the OOI, by comparing the soundscaped signature with the second audio.

19. The device of claim 11, wherein the controller is further configured to:
generate a score associated with detecting the soundscaped signature of the OOI in the second audio from the second camera; and
generate the notification only when the score is greater than a threshold score.

20. The device of claim 11, wherein the OOI is absent in second video of the second camera and the soundscaped signature is present in the second audio of the second camera.

* * * * *